US008168033B1

(12) United States Patent
Mohamad Nor

(10) Patent No.: US 8,168,033 B1
(45) Date of Patent: May 1, 2012

(54) METHODS AND DEVICES FOR PRINTING AND AFFIXING AN INDIVIDUAL LABEL ONTO AN ITEM HAVING A MACHINE READABLE CODE THEREON

(75) Inventor: Ahmad Redzman Mohamad Nor, Selangor (MY)

(73) Assignee: Western Digital Technologies, Inc., Irvine, CA (US)

( * ) Notice: Subject to any disclaimer, the term of this patent is extended or adjusted under 35 U.S.C. 154(b) by 637 days.

(21) Appl. No.: 11/761,828

(22) Filed: Jun. 12, 2007

(51) Int. Cl.

| | |
|---|---|
| ***B29C 65/48*** | (2006.01) |
| ***B32B 37/10*** | (2006.01) |
| ***B32B 37/14*** | (2006.01) |
| ***B32B 37/26*** | (2006.01) |
| ***B32B 38/10*** | (2006.01) |
| ***B32B 38/14*** | (2006.01) |
| *B32B 38/04* | (2006.01) |
| *B29C 65/72* | (2006.01) |

(52) U.S. Cl. ........ 156/285; 156/247; 156/249; 156/277; 156/DIG. 38

(58) Field of Classification Search .................. 156/277, 156/247, 249, 285, DIG. 38
See application file for complete search history.

(56) References Cited

U.S. PATENT DOCUMENTS

| | | | | |
|---|---|---|---|---|
| 4,255,997 | A | 3/1981 | Clay | |
| 4,557,786 | A | 12/1985 | Stock et al. | |
| 4,581,094 | A | 4/1986 | Sato | |
| 4,612,076 | A * | 9/1986 | Moss | 156/249 |
| 4,652,317 | A * | 3/1987 | Seestrom | 156/64 |
| 4,920,882 | A | 5/1990 | Hoyt | |
| 5,078,670 | A * | 1/1992 | Volkert | 493/346 |
| 5,149,211 | A * | 9/1992 | Pettigrew et al. | 400/88 |
| 5,264,066 | A | 11/1993 | Lundell | |
| 5,405,482 | A * | 4/1995 | Morrissette et al. | 156/364 |
| 5,602,377 | A * | 2/1997 | Beller et al. | 235/462.15 |
| 5,853,530 | A | 12/1998 | Allen | |
| 6,179,030 | B1 | 1/2001 | Rietheimer | |
| 6,428,640 | B1 * | 8/2002 | Stevens et al. | 156/64 |
| 6,471,817 | B1 * | 10/2002 | Emmert | 156/257 |
| 6,615,106 | B2 | 9/2003 | Soto et al. | |
| 7,469,820 | B2 * | 12/2008 | Rosenblum | 235/375 |
| 7,809,156 | B2 * | 10/2010 | Piersol et al. | 382/100 |
| 8,020,774 | B2 * | 9/2011 | Ohashi et al. | 235/492 |
| 2001/0035261 | A1 * | 11/2001 | Banahan | 156/277 |
| 2002/0088550 | A1 | 7/2002 | Allen et al. | |
| 2003/0127195 | A1 | 7/2003 | Barbosa | |
| 2008/0017303 | A1 * | 1/2008 | Crouch | 156/249 |

OTHER PUBLICATIONS http://www.abledesigninc.com/1095_109.htm, one page.
http://www.accuplace.com/3065features.asp, one page.
http://www.accuplace.com/3065.pdf, one page.

* cited by examiner

*Primary Examiner* — Sony Mazumdar

(57) ABSTRACT

Methods and systems are disclosed for printing and affixing an individual label onto an item having a machine readable code thereon. The method includes steps of scanning the machine readable code to obtain unique item information from the scanned machine readable code; supplying a label to a printer; sending the unique item information to the printer; printing information to the label using the unique item information; and affixing the printed label onto the item.

20 Claims, 4 Drawing Sheets

*FIG. 1A*
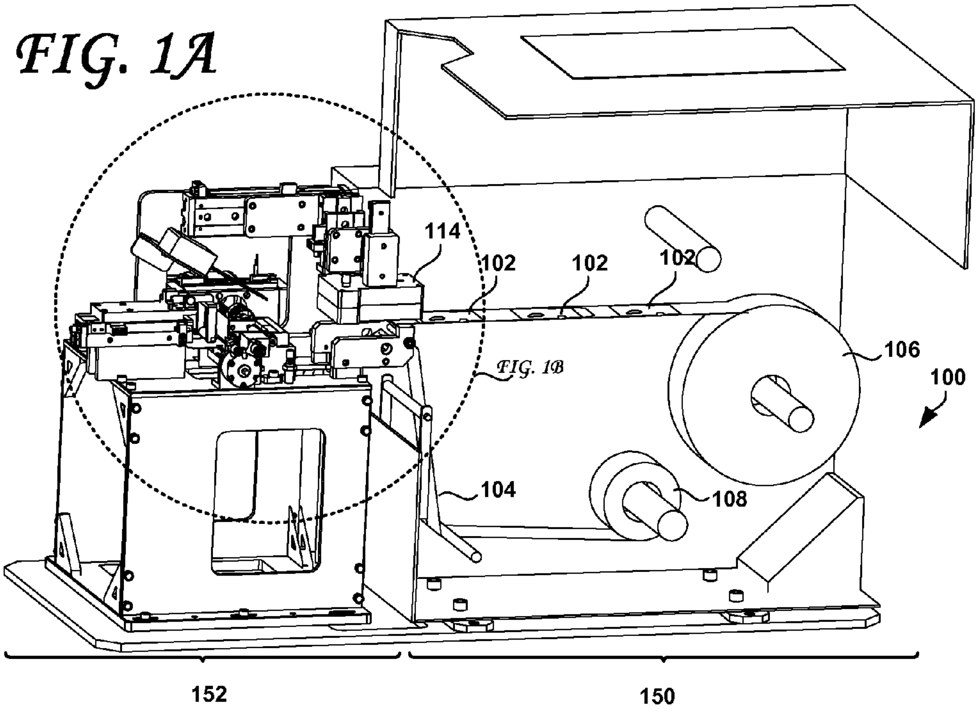
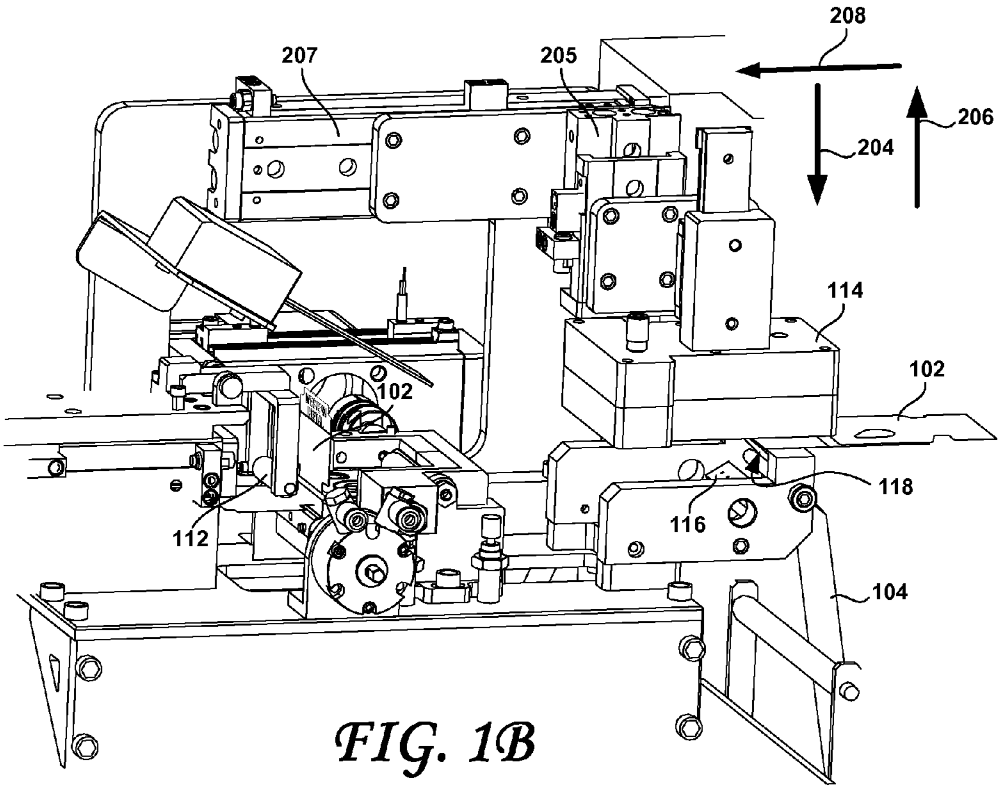
*FIG. 1B*

METHODS AND DEVICES FOR PRINTING AND AFFIXING AN INDIVIDUAL LABEL ONTO AN ITEM HAVING A MACHINE READABLE CODE THEREON

BACKGROUND OF THE INVENTION

1. Field of the Invention

The present invention relates generally to methods and devices for printing and affixing individual (e.g., unique) labels on items having a machine readable code thereon.

2. Description of the Related Art

Conventional industrial label printers are configured to print identical labels on manufactured items. Although the items may include a unique machine-readable code thereon, the labels affixed to them typically contain no information obtained from the machine-readable code. For example, in the case wherein the manufactured item is a hard disk drive (e.g., a 1-inch drive), such label printers conventionally print the same label for every disk drive even though the drive may include machine readable code printed or otherwise provided thereon. Accordingly, the labels affixed to such disk drives do not bear any information that is unique to the specific disk drive to which the label is affixed.

Moreover, as the form factor of hard disk drives continues to shrink, the process of printing and affixing labels to small form factor disk drives becomes increasingly difficult. For example, for 1-inch and smaller form factor disk drives, conventional processes and devices for printing and affixing labels begin to reveal their inherent limitations. Indeed, for such small form factor drives, the label is both small and thin (may be about 1.8 mils thick, for example), rendering the label flimsy and difficult to peel from its backing material. It is also difficult to pick up the peeled label and to accurately place it on the drive without wrinkling the label and without trapping air bubbles between the drive and the label.

There is, therefore, a need for methods and automated devices for printing and affixing individual labels on items.

SUMMARY OF THE INVENTION

According to an embodiment of the present invention, a method of printing and affixing an individual label onto an item having a machine readable code thereon. The method may include scanning the machine readable code to obtain unique item information from the scanned machine readable code; supplying a label to a printer; sending the unique item information to the printer; printing information to the label using the unique item information; and affixing the printed label onto the item.

Another embodiment of the present invention is an automated device to print an individual label for an item having a machine readable code thereon. The automated device may include a scanner configured to scan machine readable code to obtain unique item information from the scanned machine readable code; a printer coupled to the scanner for receiving the unique item information from the scanner; a label supply roll supplying a strip of labels adhered to a strip of backing material to the printer; and a take up roll coupled to the label supply roll via the strip of backing material such that the printer prints to the strip of labels between the label supply roll and the take up roll.

BRIEF DESCRIPTION OF THE DRAWINGS

FIG. 1A is a view of an automated device to print an individual label for an item having a machine readable code thereon, according to an embodiment of the present invention.

FIG. 1B is a detail view of a portion of the automated device of FIG. 1A.

DESCRIPTION OF THE PREFERRED EMBODIMENTS

FIG. 1A is a view of an automated device 100 to print an individual label for an item having a machine readable code thereon, according to an embodiment of the present invention. As shown therein, the automated device 100 may include a printer portion 150 and a peel, pick and place portion 152. Within the present context, the item onto which the individual label is affixed is a hard disk drive; specifically, a 1-inch form factor disk drive. It is understood, however, that the present automated devices and methods may be practiced with most any other item or disk drives having a different form factor, the present embodiments not being limited to the example of labels for 1-inch disk drives.

According to embodiments of the present invention, each item (such as the aforementioned disk drives, for example) may have unique or individual item information printed or otherwise affixed or provided thereon. Such unique item information may include, for example, an identification of the manufacturer of the disk drive, a model number and capacity of the disk drive, a serial number of the disk drive, lot number and/or other pertinent information (such as formatting information and/or power requirements for example). The unique item information may be written in plain text or may be provided as some other machine readable code, such as a bar code or other more advanced machine readable codes having a greater information carrying capacity.

Figure 2:
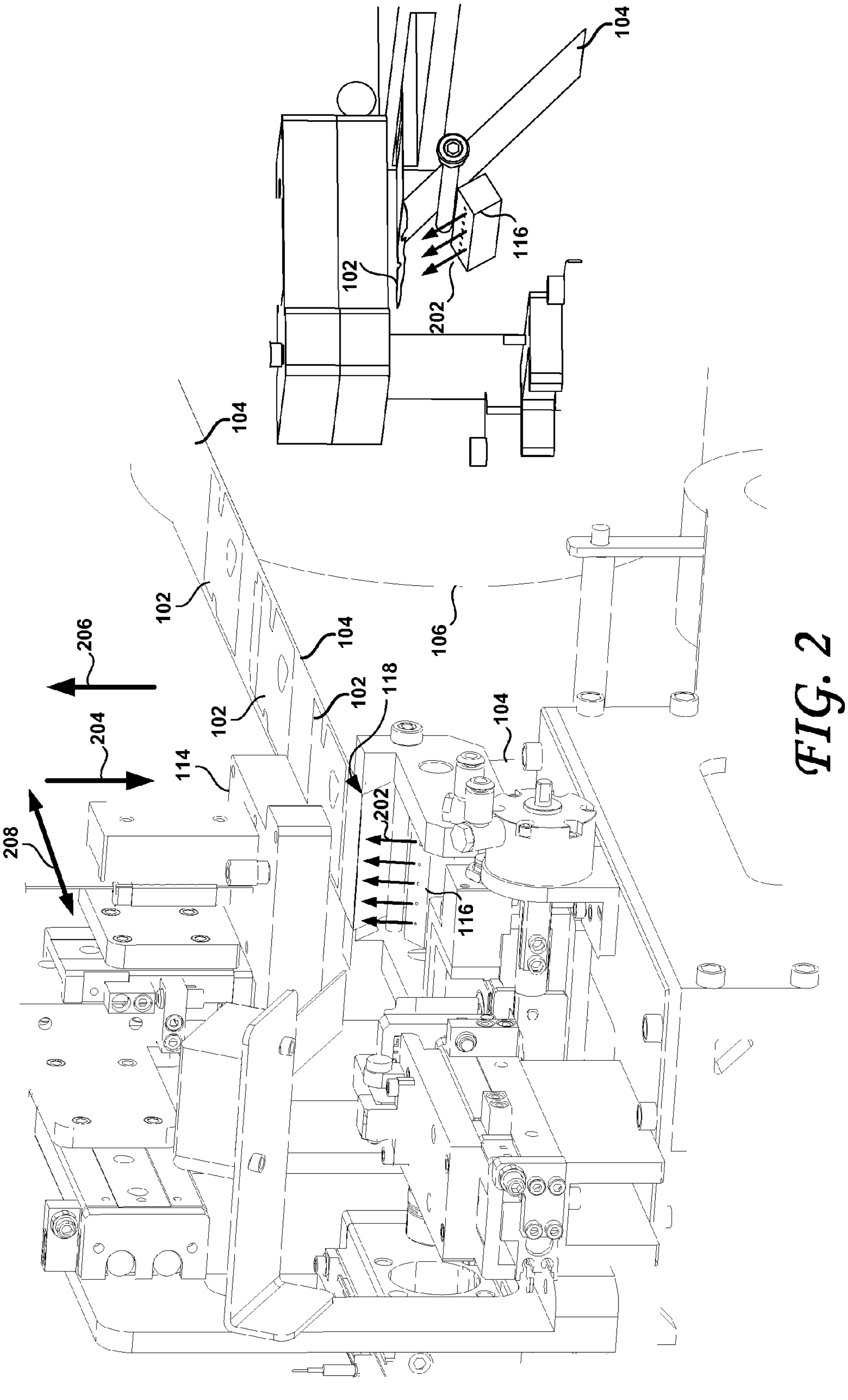
FIG. 2 shows details of a peel, pick and place unit of an automated device to print an individual label for an item having a machine readable code thereon, according to an embodiment of the present invention
Figure 3:
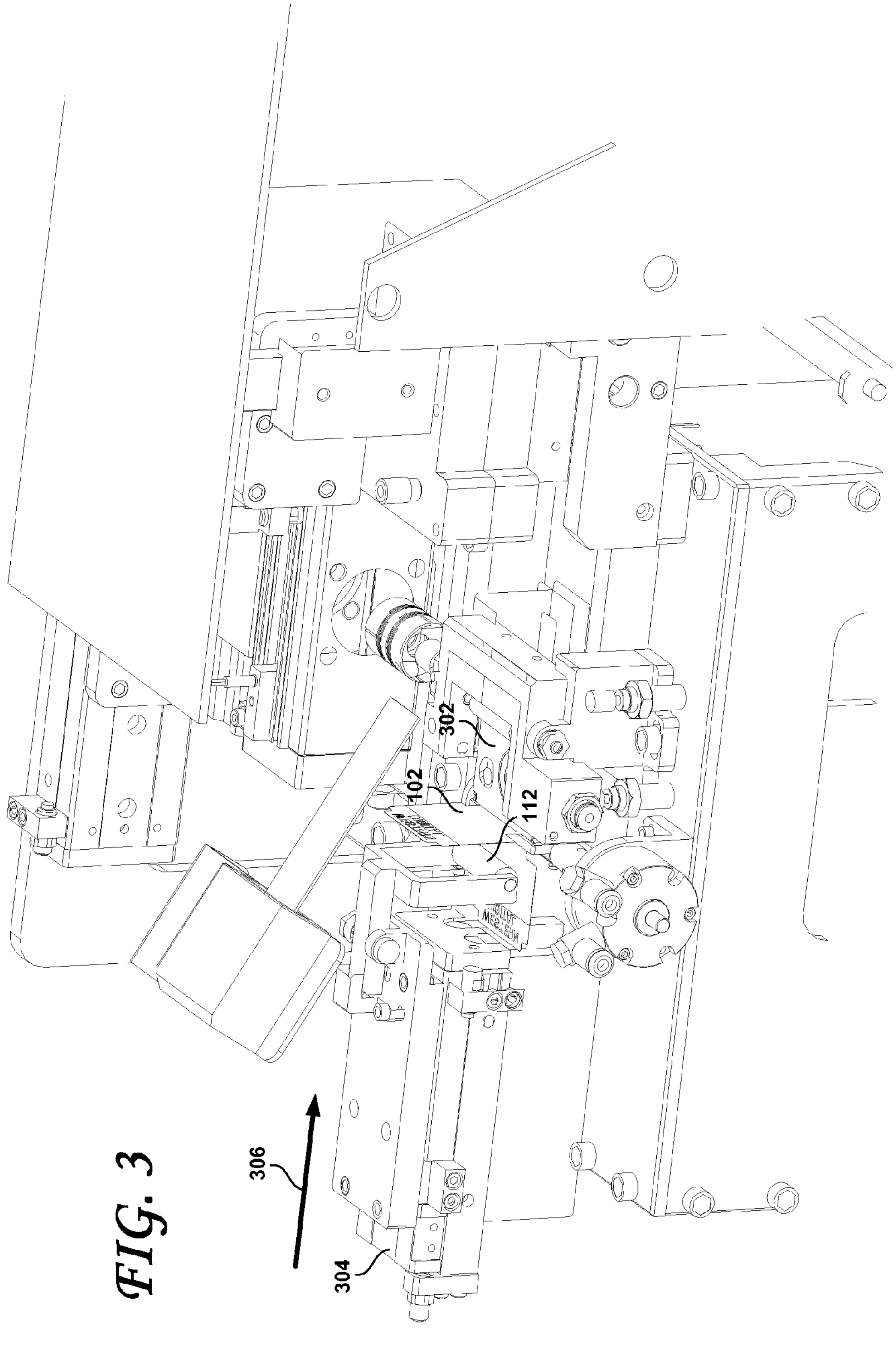
FIG. 3 shows a detail view of an exemplary mechanism for affixing a label onto an item, according to an embodiment of the present invention.

The automated device of FIGS. 1-3 includes a scanner that is configured to scan the machine readable code on the disk drive loaded into the peel, pick and place portion 152 to obtain the unique item information from the loaded disk drive. Such unique item information obtained by the scanner may then be provided to the printer portion 150 that is coupled to the scanner. The printer portion 150 may then print unique printed information to a label 102 based on all or a portion of the provided unique item information. This label 102 may then be supplied to the peel, pick and place portion 152 of the automated device 100. The label 102 may then be affixed onto the item (in the example developed herein, a disk drive). In certain embodiments, the printer portion 150 may simply print a representation (machine and/or human-readable) of the unique item information received from the scanner. In other embodiments, the unique item information received from the scanner may undergo some processing before the printer portion 150 prints unique printed information based on this unique item information.

The label 102 may be provided on a roll or strip of identical blank labels (in the present context, blank labels lack unique printed information corresponding to a particular disk drive, but may still have pre-printed information or other graphic designs printed thereon). The strip of blank labels may include a continuous strip of backing material 104 and a plurality of blank labels 102 adhered on a surface of the strip of backing material 104 at regular intervals. To supply the labels 102 to the peel, pick and place portion 152 of the automated device 100, the printer portion 150 may include a label supply roll 106 and a take up roll 108 that collects the strip of backing material 104 after the printed labels 102 have been peeled off the strip of backing material 104. It should be noted that other configurations are possible. For example, instead of supply and take up rolls 106, 108, the continuous strip of backing material 104 may be creased so as to fold accordion-style. The labels 102 may then be provided to the print mechanism of the printer portion 150 as a stack of blank labels and the backing material may be returned and similarly folded along the provided creases. Other configurations are possible and present embodiments are not limited to the manner in which the labels 102 are provided to the printer portion 150. The labels 102 may be provided to the print mechanism of the printer portion 150 by a stepper motor, as is known in this art.

After the label 102 has been printed with the desired unique printed information, the printed label 102 may be removed from the continuous strip of backing material 104 to allow the removed label to be affixed to the loaded drive. Reference is now made to FIGS. 1B and 2, which show detail views of the peel, pick and place portion 152 of the automated device 100, according to an embodiment of the present invention. As shown therein, a printed label 102, still adhered to the strip of backing material 104, may be provided to the peel, pick and place portion 152. According to an embodiment of the present invention, the label 102 may be printed and peeled (that is, at least partially printed and at least partially peeled) at the same time. The printed label bearing the unique printed information must be detached from the strip of backing material 104, to enable the label 102 to be affixed to the loaded drive or other item. In one embodiment, a surface that forms a knife edge 118 is provided. The knife edge 118 may be static relative to the labels 102 and the strip of backing material 104 and may form a predetermined acute angle of, for example, 25 to 80 degrees (such as, for example, about 45 to 60 degrees) relative to the incoming strip of backing material 104. As the strip of backing material 104 is kept in tension between the supply and take up rolls 106, 108, the adhesive force keeping the label 102 attached to the backing material 104 is overcome, and the label 102 begins to peel off the continuous strip of backing material 104 as the continuous strip of backing material 104 is advanced (paid out from the supply roll 106 and taken up by the take up roll 108). An optical sensor may be provided, to sense when the label 102 is properly positioned and ready to be picked by the pick and place portion 152.

To assist in the peeling of the labels 102 from the strip of backing material 104, the automated device 100 may also include an air blower 116 (shown in FIG. 1B, best shown in FIG. 2) having one or more air outlets disposed near the static knife edge 118. As shown in FIG. 2, the blower 116 may include a plurality of outlets disposed and configured so as to blow a stream of air (and/or other gas) onto the underside of the partially peeled label, thereby keeping the partially peeled label 102 in a predetermined orientation. The predetermined orientation, according to an embodiment of the present invention, is a more or less horizontal orientation that allows the pick and place unit 114 to "hold" the label 102, to finish peeling the label 102 from its backing material 104 (if not already fully peeled therefrom) and to transport and place the peeled label 102 onto the item (such as the loaded disk drive, for example).

The pick and place unit 114, according to an embodiment of the present invention, may include a vacuum chuck that is configured to apply a partial vacuum to a non-adhesive side of the peeled label 102. In one embodiment, the vacuum chuck of the pick and place unit 114 may be triggered by an optical sensor (such as a fiber optic sensor, for example) indicating that the label 102 is properly positioned and may be lowered on the slide support 205 to bring it in intimate contact with the label 102, the underside (adhesive side) of which may be subjected to the upwardly-directed force generated by the stream of air 202 exiting from the outlets of the blower 116. The vacuum chuck may be lowered close to the label 102 before the partial vacuum is applied. This tends to avoid or minimize wrinkles or trapped air bubbles between the vacuum chuck and the label and results in the label 102 being smoothly applied to the item, thereby also minimizing wrinkles and air bubbles between the item and the label. Thus, the vacuum chuck may be controlled to move downward along the slide support 205 in the direction of arrow 204 until it comes into contact with (or close to) the label 102 and applies suction to the non-adhesive side of the label 102. At this point, about 90 percent of the surface area of the label 102 may be lying flat and sealed against the vacuum chuck and detached from the strip of backing material 104. Therefore, if not already peeled, the label 102 may be fully peeled from the backing material 104 as the vacuum chuck and peeled label (coupled to the vacuum chuck by the partial vacuum) is moved back upwards on the slide support 205, in the direction of arrow 206.

The vacuum chuck of the pick and place unit 114 may then be moved on a support slide 207 in the direction of arrow 208 to a suitable position for affixing the label 102. For example, the vacuum chuck and label 102 may be moved along the slide support 207 to a position in which the label 102 held by the vacuum chuck is just above the item onto which the label 102 is to be affixed. For example, the vacuum chuck and label 102 may be moved to a position that is just above the cradle 302 in FIG. 3, which is where the item (in this case, a disk drive) is loaded for the purpose of affixing the label 102 thereon. A position sensor (such as an optical sensor, for example) may be provided to ensure that the vacuum chuck is positioned exactly above the item onto which the label 102 is to be affixed.

Thereafter, the vacuum chuck may be lowered to a position in which the label 102 held by the vacuum chuck makes contact or near contact with the disk drive loaded in its cradle 302. The vacuum chuck preferably then stops applying vacuum, and the label 102 may then be pressed onto the drive loaded in the cradle 302 by a roller 112 (best seen in FIG. 3) that rolls over the surface of the drive on the slide support 304 in the direction indicated by arrow 302, to smoothly affix the label 102 onto a first surface of the drive. According to an embodiment of the present invention, the label 102 may be designed to cover more than one surface of the item. Indeed, the label 102 may be designed to cover a first surface of the drive, an edge or side thereof, as well as a second side thereof, opposite the first side. To enable the peel, pick and place unit 152 to affix the label 102 onto the edge of the item and onto the second surface, after the label 102 may be affixed to the first surface, the item may be automatically flipped over such that the second surface of the item faces up. The roller 112, having since retracted back to its initial position (shown in FIG. 3), once again rolls over the item, to affix the remaining portion of the label onto the second surface of the item, to fully affix the label 102 onto the item.

Figure 4:
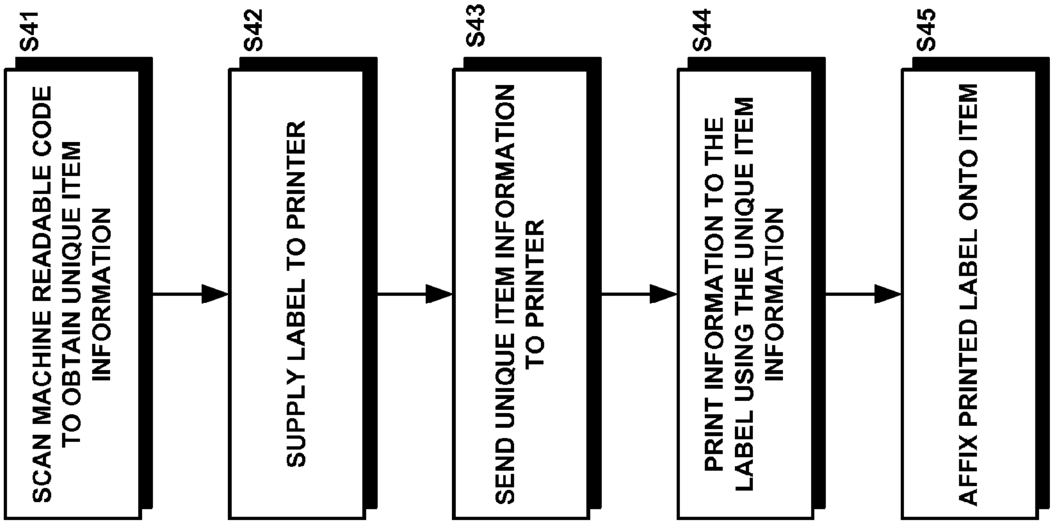
FIG. 4 is a flowchart of a method of printing and affixing an individual label onto an item having a machine readable code thereon, according to an embodiment of the present invention.

FIG. 4 is a flowchart of a method according to an embodiment of the present invention. As shown at step S41, an embodiment of the present invention may include a step of scanning a machine readable code on the item on which the label is to be affixed, to obtain the unique item information. Moreover, although barcodes have been described herein as one possible machine readable code, embodiments of the present invention are not limited thereto. For example, the items may have a Radio Frequency Identification Device (RFID) affixed to or embedded therein. In that case, the scanning step may include querying the RFID tag to obtain the unique item information. Those of skill in the manufacturing arts will undoubtedly recognize that other alternatives are possible.

As shown at step S42, the method may also include a step of supplying one or more labels to the printer portion 150. The supplying step S42 may include mounting a strip of backing material 104 and adhered labels 102 onto a label supply roll, as shown in FIG. 1 at reference numeral 106. Note that step S42 need not occur after the scanning step S41. For example, the label(s) may have been previously supplied to the printer portion 150. Moreover, the supplying step S42 may further include feeding the strip of backing material 104 and adhered labels 102 to the printer portion 150.

Step S43 calls for the unique item information obtained from the scanning step S41 to be sent to the printer portion 150, and step S44 calls for the unique item information sent to the printer portion 150 to be used to print the customized, individual label to be affixed to the item. Note that the printing step includes printing unique printed information based on all or only a portion of the unique item information scanned from the item onto which the label is to be affixed. Moreover, the printing step may include printing other information and/or graphical content onto the label, in addition to the unique printed information.

Step S45 calls for the label printed in step S45 to be affixed onto the item. The printer portion 150 of the automated device 100 may be obtained, for example, from Zebra Technologies Corporation of Vernon Hills, Ill., although such printers do not include the label peel structures and functionalities disclosed herein. Such a printer may then be modified to include the label peel structures and functionality described above.

As shown and described herein, step S45 may include a number of steps, including peeling the label 102 from the strip of backing material 104. Step S45 may also include picking the printed and peeled label 102 up and placing the picked up label onto the item, as described relative to FIGS. 1A, 1B, 2 and 3. As discussed above, at least a portion of the peeling step of step S45 may take place simultaneously with at least a portion of the printing step of step S44, due to the proximity of the peel, pick and place portion 152 to the printer portion 150. The peel, pick and place portion 152 of the automated device 100 may include, for example, an Accuplace applicator and labeler, model 3065 or 4065, available from AccuPlace of Plantation, Fla. The strip of backing material 104 may be coupled to a take up roller 108, such that the strip of backing material 104 is wound onto the take up roller 108 after the label 102 has been printed and peeled from the strip of backing material 104. Alternatively, the supply and take up rollers 106, 108 may be omitted in favor of other configurations.

The peeling step preferably includes running the strip of backing material with the label(s) adhered thereon over a static knife edge 118 at an acute angle to the strip of backing material. The peeling step may also include a step of blowing air (and/or other gas) as shown at 202 in FIG. 2 onto an adhesive side of the label 102 as the label 102 is separated from the strip of backing material 104. The blower 116 may be configured to blow a stream of air 202 onto the adhesive side of the label 102 such that the label 102 maintains a predetermined orientation (for example, more or less horizontal) while it is being peeled from the strip of backing material 104, as shown in the right hand portion of FIG. 2. Indeed, the blower assists the static knife edge 118 to separate the label 102 from its strip of backing material 104. If the stream of air 202 output from the blower 116 is not sufficiently strong, the label 102 will tend to droop down, making it difficult for the vacuum chuck to properly seal onto the label 102. Therefore, the pressure of the stream of air 202 should be adjusted such that the label 102 is substantially horizontal or in another predetermined orientation that is suited to forming a seal with the vacuum chuck.

As also described earlier, the vacuum chuck of the pick and place unit 114 may then apply a partial vacuum to a non-adhesive side of the label (before the printing step is completed, according to one embodiment). The affixing step S45 may further include affixing a first portion of the label onto a first side of the item, flipping the item over and affixing a second portion of the label 102 onto a second side of the item. Affixing the second portion of the label onto the second side of the item may include rolling a roller such as shown at 112 against a non-adhesive side of the label 102. Doing so may also affix a third portion of the label onto a third side (e.g., an edge or side) of the item. Although a 1-inch form factor disk drive has been used as an illustrative example of the item onto which the label 102 is to be affixed, the embodiments of the present invention are not to be limited thereto.

I claim:

1. A method of printing and affixing an individual label onto an item having a machine readable code thereon, comprising:

scanning the machine readable code to obtain unique item information from the scanned machine readable code utilizing an automated device comprising a scanner, a printer, and a peel, pick, and place portion;

supplying a label to the printer;

sending the unique item information to the printer;

printing information to the label using the unique item information;

positioning a vacuum chuck of the peel, pick, and place portion adjacent to the label;

applying, with the vacuum chuck, a partial vacuum to the label to pick the label up, wherein the vacuum chuck is positioned adjacent to the label before the partial vacuum is applied; and affixing the label onto the item utilizing the peel, pick, and place portion, wherein affixing the label onto the item includes affixing a first portion of the label onto a first side of the item, flipping the item over and affixing a second portion of the label onto a second side of the item.

2. The method of claim 1, wherein the machine readable code includes a barcode.

3. The method of claim 1, further comprising mounting a strip of backing material and adhered labels onto a label supply roll.

4. The method of claim 3, wherein supplying the label to the printer includes feeding the strip of backing material and adhered labels to the printer.

5. The method of claim 3, wherein affixing the label onto the item further comprises peeling the label from the strip of backing material.

6. The method of claim 5, wherein at least a portion of the peeling step occurs at a same time as at least a portion of the printing step.

7. The method of claim 3, wherein affixing the label onto the item further comprises placing the picked up label onto the item.

8. The method of claim 5, further comprising coupling the strip of backing material to a take up roller such that the strip of backing material is wound onto the take up roller after the label has been printed and peeled from the strip of backing material.

9. The method of claim 5, wherein peeling the label from the strip of backing material includes running the strip of backing material with the label adhered thereon over an edge of a static knife.

10. The method of claim 9, wherein peeling the label from the strip of backing material includes running the strip of backing material over the knife edge at an acute angle.

11. The method of claim 10, wherein the acute angle between the knife edge and the strip of backing material is between 45 and 60 degrees.

12. The method of claim 5, wherein peeling the label from the strip of backing material includes blowing air onto an adhesive side of the label as the label is separated from the strip of backing material.

13. The method of claim 12, wherein blowing air onto the label is carried out such that the label maintains a predetermined orientation while it is being peeled from the strip of backing material.

14. The method of claim 7, wherein the partial vacuum is applied to a non-adhesive side of the label.

15. The method of claim 1, wherein the partial vacuum is applied to the label before the printing step is completed.

16. The method of claim 1, wherein affixing the second portion of the label onto the second side of the item includes rolling a roller against a non-adhesive side of the label.

17. The method of claim 1, wherein affixing the label onto the item further includes affixing a third portion of the label onto a third side of the item.

18. The method of claim 1, wherein the item comprises a disk drive.

19. A method of printing and affixing an individual label onto an item having a machine readable code thereon, comprising:

scanning the machine readable code to obtain unique item information from the scanned machine readable code utilizing an automated device comprising a scanner, a printer, and a peel, pick, and place portion;

supplying a label to the printer;

sending the unique item information to the printer;

printing information to the label using the unique item information;

affixing a first portion of the label onto a first side of the item utilizing the peel, pick, and place portion;

flipping the item over utilizing the peel, pick, and place portion; and affixing a second portion of the label onto a second side of the item utilizing the peel, pick, and place portion.

20. The method of claim 19, wherein the item comprises a storage device.

* * * * *